(12) United States Patent
Lock et al.

(10) Patent No.: US 7,627,543 B2
(45) Date of Patent: Dec. 1, 2009

(54) AUTOMATED ANOMALY DETECTION

(75) Inventors: Zoe Paula Lock, Malvern (GB); Emma Cecilia Peeling, Malvern (GB); Claire Julia Thie, Malvern (GB); Neil Christopher Charles Brown, Malvern (GB); Richard Hatch, Malvern (GB); Alan Barry Hood, Malvern (GB); Simon Kilvington, Malvern (GB); Mohammed Irfan Zakiuddin, Malvern (GB)

(73) Assignee: Qinetiq Limited (GB)

( * ) Notice: Subject to any disclaimer, the term of this patent is extended or adjusted under 35 U.S.C. 154(b) by 138 days.

(21) Appl. No.: 10/580,767

(22) PCT Filed: Nov. 22, 2004

(86) PCT No.: PCT/GB2004/004919
§ 371 (c)(1),
(2), (4) Date: May 26, 2006

(87) PCT Pub. No.: WO2005/055073
PCT Pub. Date: Jun. 16, 2005

(65) Prior Publication Data
US 2007/0112824 A1    May 17, 2007

(30) Foreign Application Priority Data
Nov. 27, 2003    (GB)    ................... 0327612.8
Nov. 28, 2003    (GB)    ................... 0327627.6
Nov. 1, 2004    (GB)    ................... 0424076.8

(51) Int. Cl.
G06N 5/02    (2006.01)

(52) U.S. Cl. .............................. 706/47; 706/20; 706/45; 706/52

(58) Field of Classification Search .................. 706/20, 706/21, 45–47, 52, 60; 705/2–4, 18, 35, 705/44, 50, 51, 67, 72, 75; 726/22–33
See application file for complete search history.

(56) References Cited

U.S. PATENT DOCUMENTS
5,222,197 A * 6/1993 Teng et al. .................... 706/58
(Continued)

FOREIGN PATENT DOCUMENTS
| EP | 0 752 648 | 1/1997 |
| GB | 2387681 | 10/2003 |
| WO | WO 99/13427 | 3/1999 |

OTHER PUBLICATIONS

Cho et al., Fuzzy-PID hybrid control: Automatic rule generation using genetic algorithms, Fuzzy Sets and Systems, Elsevier, pp. 305-316 (1997).

(Continued)

*Primary Examiner*—David R Vincent
*Assistant Examiner*—Omar F Fernandez Rivas
(74) *Attorney, Agent, or Firm*—McDonnell Boehnen Hulbert & Berghoff LLP

(57) ABSTRACT

A method of anomaly detection applicable to telecommunications or retail fraud or software vulnerabilities uses inductive logic programming to develop anomaly characterization rules from relevant background knowledge and a training data set, which includes positive anomaly samples of data covered by rules. Data samples include 1 or 0 indicating association or otherwise with anomalies. An anomaly is detected by a rule having condition set which the anomaly fu,lfils. Rules are developed by addition of conditions and unification of variables, and are filtered to remove duplicates, equivalents, symmetric rules and unnecessary conditions. Overfitting of noisy data is avoided by an encoding cost criterion. Termination of rule construction involves criteria of rule length, absence of negative examples, rule significance and accuracy, and absence of recent refinement. Iteration of rule construction involves selecting rules with unterminated construction, selecting rule refinements associated with high accuracies, and iterating a rule refinement, filtering and evaluation procedure to identify any refined rule usable to test data. Rule development may use first order logic or Higher Order logic.

15 Claims, 4 Drawing Sheets

U.S. PATENT DOCUMENTS

| | | | |
|---|---|---|---|
| 5,627,945 | A | 5/1997 | Cohen |
| 5,790,645 | A | 8/1998 | Fawcett et al. |
| 6,523,020 | B1 * | 2/2003 | Weiss .......................... 706/47 |
| 6,601,048 | B1 | 7/2003 | Gavan et al. |
| 6,782,377 | B2 * | 8/2004 | Agarwal et al. ............... 706/47 |
| 7,089,592 | B2 * | 8/2006 | Adjaoute .................... 726/25 |
| 7,305,373 | B1 * | 12/2007 | Cunningham et al. ......... 706/47 |
| 7,353,214 | B2 * | 4/2008 | Yamanishi et al. ............ 706/46 |
| 2002/0143577 | A1 | 10/2002 | Shiffman et al. |
| 2002/0147754 | A1 | 10/2002 | Dempsey et al. |
| 2002/0161711 | A1 * | 10/2002 | Sartor et al. .................. 705/51 |

OTHER PUBLICATIONS

Lavrac et al., "Inductive Logic Programming: Techniques and Applications", Ellis Harwood, pp. 62-158 (1994).

Castellano et al., "Automatic generation of rules for a fuzzy robotic controller", Proc. IROS, pp. 1179-1186 (1996).

* cited by examiner

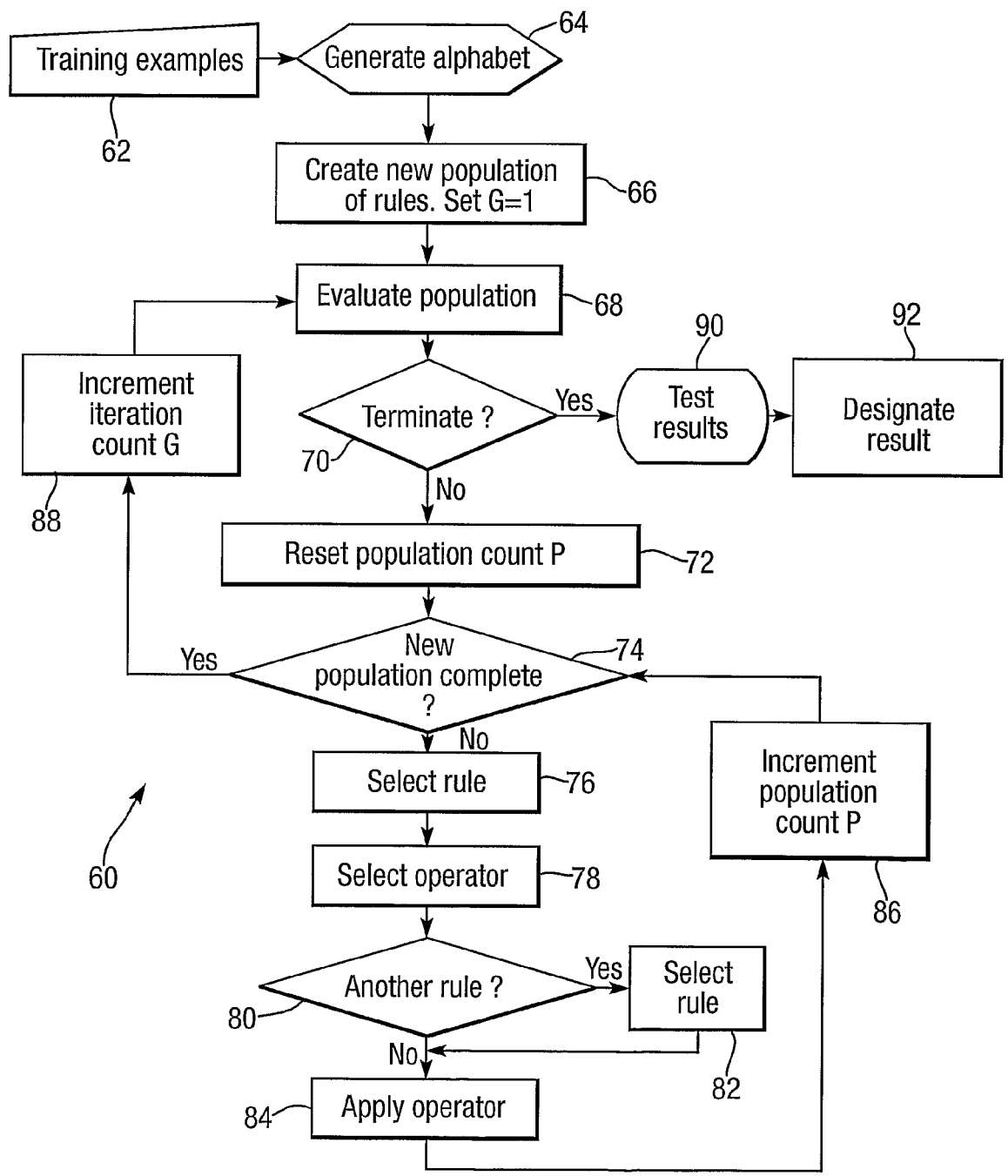

AUTOMATED ANOMALY DETECTION

BACKGROUND OF THE INVENTION (1) Field of the Invention

This invention relates to automated anomaly detection in data, and to a method, an apparatus and computer software for implementing it. More particularly, although not exclusively, it relates to detection of fraud in areas such as telecommunications and retail sales and to detection of software vulnerabilities by searching for anomalies in digital data.

(2) Description of the Art

It is known to detect data anomalies such as fraud or software vulnerabiiities with the aid of management systems which use hand-crafted rules to characterise fraudulent behaviour. In the case of fraud, the rules are generated by human experts in fraud, who supply and update them for use in fraud management systems. The need for human experts to generate rules is undesirable because it is onerous, particularly if the number of possible rules is large or changing at a significant rate.

It is also known to avoid the need for human experts to generate rules: i.e. artificial neural networks are known which learn to characterise fraud automatically by processing training data. They use characteristics so learned to detect fraud in other data. However, neural networks characterise fraud in a way that is not clear to a user and does not readily translate into recognisable rules. It is important to be able to characterise fraud in terms of breaking of acceptable rules, so this aspect of neural networks is a disadvantage.

Known rule-based fraud management systems can detect well-known types of fraud because human experts know how to construct appropriate rules. In particular, fraud over circuit-switching networks is well understood and can be dealt with in this way. However, telecommunications technology has changed in recent years with circuit-switching networks being replaced by Internet protocol packet-switching networks, which can transmit voice and Internet protocol data over telecommunications systems. Fraud associated with Internet protocol packet-switching networks is more complex than that associated with circuit-switching networks: this is because in the Internet case, fraud can manifest itself at a number of points on a network, and human experts are still learning about the potential for new types of fraud. Characterising complex types of fraud manually from huge volumes of data is a major task. As telecommunications traffic across packet-switching networks increases, it becomes progressively more difficult to characterise and detect fraud.

U.S. Pat. No. 6,601,048 to Gavan discloses rule-based recognition of telephone fraud by a thresholding technique: it establishes probabilities that certain occurrences will be fraudulent most of the time (e.g. 80% of credit card telephone calls over 50 minutes in length are fraudulent). It mentions that fraudulent behaviour is established from records but not how it is done.

U.S. Pat. No. 5,790,645 to Fawcett et al. also discloses rule-based recognition of telephone fraud. It captures typical customer account behaviour (non-fraudulent activity) and employs a standard rule learning program to determine rules distinguishing fraudulent activity from non-fraudulent activity. Such a rule might be that 90% of night-time calls from a particular city are fraudulent. Rules are used to construct templates each containing a rule field, a training field monitoring some aspect of a customer account such as number of calls per day, and a use field or functional response indicating fraudulent activity, e.g. number of calls reaching a threshold. Templates are used in one or more profilers of different types which assess customer account activity and indicate fraudulent behaviour: a profiler may simply indicate a threshold has been reached by output of a binary 1, or it may give a count of potentially fraudulent occurrences, or indicate the percentage of such occurrences in all customer account activity. The approach of detecting deviation from correct behaviour is more likely to yield false positives than detecting fraud directly, because it is difficult to characterise all possible forms of normal behaviour.

US Pat. Appln. No. US 2002/0143577 to Shiffman et al. discloses rule-based detection of compliant/valid non-compliant/invalid responses by subjects in clinical trials. Quantitative analysis is used to distinguish response types. This corresponds to rule generation by human experts which is time consuming. There is no disclosure of automatic rule generation.

US Pat. Appln. No. US 2002/0147754 to Dempsey et al. discloses detection of telecommunications account fraud or network intrusion by measuring difference between two vectors.

There is also a requirement for automated detection of potentially exploitable vulnerabilities in compiled software, i.e. binary code, by searching for code anomalies comprising potentially incorrect code fragments. A malicious attacker may be able to force such fragments to be executed in such a way as to cause a computer system running code containing the fragments to behave insecurely.

Software vulnerabilities in computer source code are detectable using static analysis techniques, also referred to as white-box testing techniques. However, source code is frequently not available for analysis and white-box techniques are not applicable.

As before, the need for human experts to generate rules is undesirable because it is onerous. Although human experts may have much experience, it is not feasible for them to learn from all possible scenarios. Gaining additional and wider experience takes time and resources. Once a rule base is derived, it can be used to identify whether new software applications contain potentially exploitable binary code. However, current systems of vulnerability detection have rule bases which are typically static, i.e. unchanging over time unless rules are added or edited manually. As new vulnerabilities become apparent, such a system needs to be updated by hand in order to be able to identify associated 'bugs'. Further deficiencies of a rule-based approach is that it has a limitation on 'semantic depth' that is practical for such techniques. A vulnerability having semantics which are sufficiently complex is not likely to be detectedby such an approach.

United Kingdom Patent GB 2387681 discloses machine learning of rules for network security. This disclosure concentrates on use of first-order logic to represent rules for dealing with the problem of intrusion detection. It involves firstly attempting to characterise, either pre-emptively or dynamically, behaviours on a given computer network that correspond to potentially malicious activity; then, secondly, such characterisation provides a means for preventing such activity or raising an alarm when such activity takes place. Intrusion detection techniques, such as that proposed in GB 2387681, do not address the problem of finding underlying vulnerabilities that might be used as part of an intrusion, rather they are concerned with characterising and monitoring network activity. Intrusion detection systems use on-line network monitoring technology rather than a static off-line assessment of code binaries. They therefore detect intrusion after it has happened, rather than forestalling it by detecting potential code vulnerabilities to enable their removal prior to exploitation by an intruder.

It is an object of the present invention to provide an alternative approach to anomaly detection.

SUMMARY OF THE INVENTION

The present invention provides a method of anomaly detection characterised in that it incorporates the steps of:
a) developing a rule set of at least one anomaly characterisation rule from a training data set and any available relevant background knowledge using at least first order logic, a rule covering a proportion of positive anomaly examples of data in the training data set, and
b) applying the rule set to test data for anomaly detection therein. in an alternative aspect the present invention provides an automated method of anomaly detection characterised in that it comprises using computer apparatus to execute the steps of:
a) developing a rule set of at least one anomaly characterisation rule from a training data set and any available relevant background knowledge using at least first order logic, a rule covering a proportion of positive anomaly examples of data in the training data set, and
b) applying the rule set to test data for anomaly detection therein.

The method of the invention provides the advantage that it obtains rules from data, not human experts, it does so automatically, and the rules are not invisible to a user. At least first order logic is used to generate the rule set, which allows variables in rules and general relationships between them, and it is possible to include background knowledge. In the sense used in this specification, an anomaly is a portion of data indicating some feature or features which it is desired to locate or investigate, for example fraudulent behaviour or a potentially incorrect fragment of computer program code indicating a software vulnerability.

Data samples in the training data set may have characters indicating whether or not they are associated with anomalies. The invention may be a method of detecting telecommunications or retail fraud or software vulnerabilities from anomalous data and may employ inductive logic programming to develop the rule set.

Each rule may have a form that an anomaly is detected or otherwise by application of the rule according to whether or not a condition set of at least one condition associated with the rule is fulfilled. A rule may be developed by refining a most general rule by at least one of:
a) addition of a new condition to the condition set; and
b) unification of different variables to become constants or structured terms.

A variable in a rule which is defined as being in constant mode and is numerical is at least partly evaluated by providing a range of values for the variable, estimating an accuracy for each value and selecting a value having optimum accuracy. The range of values may be a first range with values which are relatively widely spaced, a single optimum accuracy value being obtained for the variable, and the method including selecting a second and relatively narrowly spaced range of values in the optimum accuracy value's vicinity, estimating an accuracy for each value in the second range and selecting a value in the second range having optimum accuracy.

The method may include filtering to remove duplicates of rules and equivalents of rules, i.e. rules having like but differently ordered conditions compared to another rule, and rules which have conditions which are symmetric compared to those of another rule. It may include filtering to remove unnecessary 'less than or equal to' ("Iteq") conditions. Unnecessary "Iteq" conditions may be associated with at least one of ends of intervals, multiple Iteq predicates and equality condition and Iteq duplication.

The method may include implementing an encoding length restriction to avoid overfitting noisy data by rejecting a rule refinement if the refinement encoding cost in number of bits exceeds a cost of encoding the positive examples covered by the refinement.

Rule construction may stop if at least one of three stopping criteria is fulfilled as follows:
a) the number of conditions in any rule in a beam of rules being processed is greater than or equal to a prearranged maximum rule length,
b) no negative examples are covered by a most significant rule, which is a rule that:
i) is present in a beam currently being or having been processed,
ii) is significant,
iii) has obtained a highest likelihood ratio statistic value found so far, and
iv) has obtained an accuracy value greater than a most general rule accuracy value, and
c) no refinements were produced which were eligible to enter the beam currently being processed in a most recent refinement processing step.

A most significant rule may be added to a list of derived rules and positive examples covered by the most significant rule may be removed from the training data set.

The method may include:
a) selecting rules which have not met rule construction stopping criteria,
b) selecting a subset of refinements of the selected rules associated with accuracy estimate scores higher than those of other refinements of the selected rules, and
c) iterating a rule refinement, filtering and evaluation procedure to identify any refined rule usable to test data.

In another aspect, the present invention provides computer apparatus for anomaly detection characterised in that it is programmed to execute the steps of:
a) developing a rule set of at least one anomaly characterisation rule from a training data set and any available relevant background knowledge using at least first order logic, a rule covering a proportion of positive anomaly examples of data in the training data set, and
b) applying the rule set to test data for anomaly detection therein.

The computer apparatus may be programmed to develop the rule set using Higher-Order logic. It may include developing the rule set by:
a) forming an alphabet having selector functions allowing properties of the training data set to be extracted, together with at least one of the following: additional concepts, background knowledge constant values and logical AND and OR functions,
b) forming current rules from combinations of items in the alphabet such that type consistency and variable consistency are preserved,
c) evaluating the current rules for adequacy of classification of the training data set,
d) if no current rule adequately classifies the training data set, generating new rules by applying at least one genetic operator to the current rules, a genetic operator having one of the following functions: i) combining two rules to form a new rule, ii) modifying a single rule by deleting one of its conditions or adding a new condition to it, or iii) changing one of a rule's constant values for another of an appropriate type, and e) designating the new rules as the current rules and iterating steps c) onwards until a current rule adequately classifies the training data set or a predetermined number of iterations is reached.

Data samples in the training data set may have characters indicating whether or not they are associated with anomalies. The at least one anomaly characterisation rule may have a form that an anomaly is detected or otherwise by application of such rule according to whether or not a condition set of at least one condition associated with that rule is fulfilled. It may be developed by refining a most general rule by at least one of:
   a) addition of a new condition to the condition set; and
   b) unification of different variables to become constants or structured terms.

A variable in the at least one anomaly characterisation rule which is defined as being in constant mode and is numerical may be at least partly evaluated by providing a range of values for the variable, estimating an accuracy for each value and selecting a value having optimum accuracy.

The computer apparatus may be programmed to filter out at least one of rule duplicates, rule equivalents and unnecessary 'less than or equal to' ("Iteq") conditions. It may be programmed to stop construction of a rule if at least one of three stopping criteria is fulfilled as follows:
   a) the number of conditions in any rule in a beam of rules being processed is greater than or equal to a prearranged maximum rule length,
   b) no negative examples are covered by a most significant rule, which is a rule that:
      i) is present in a beam currently being or having been processed,
      ii) is significant,
      iii) has obtained a highest likelihood ratio statistic value found so far, and
      iv) has obtained an accuracy value greater than a most general rule accuracy value, and
   c) no refinements were produced which were eligible to enter the beam currently being processed in a most recent refinement processing step.

In a further aspect, the present invention provides computer software for use in anomaly detection characterised in that it incorporates instructions for controlling computer apparatus to execute the steps of:
   a) developing a rule set of at least one anomaly characterisation rule from a training data set and any available relevant background knowledge using at least first order logic, a rule covering a proportion of positive anomaly examples of data in the training data set, and
   b) applying the rule set to test data for anomaly detection therein.

The computer software may incorporate instructions for controlling computer apparatus to develop the rule set using Higher-Order logic. It may incorporate instructions for controlling computer apparatus to develop the rule set by:
   a) forming an alphabet having selector functions allowing properties of the training data set to be extracted, together with at least one of the following: additional concepts, background knowledge constant values and logical AND and OR functions,
   b) forming current rules from combinations of items in the alphabet such that type consistency and variable consistency is preserved,
   c) evaluating the current rules for adequacy of classification of the training data set,
   d) if no current rule adequately classifies the training data set, generating new rules by applying at least one genetic operator to the current rules, a genetic operator having one of the following functions: i) combining two rules to form a new rule, ii) modifying a single rule by deleting one of its conditions or adding a new condition to it, or iii) changing one of a rule's constant values for another of an appropriate type, and
   e) designating the new rules as the current rules and iterating steps c) onwards until a current rule adequately classifies the training data set or a predetermined number of iterations is reached.

Data samples in the training data set may have characters indicating whether or not they are associated with anomalies.

The at least one anomaly characterisation rule may have a form that an anomaly is detected or otherwise by application of such rule according to whether or not a condition set of at least one condition associated with that rule is fulfilled.

The computer software may incorporate instructions for controlling computer apparatus to develop the at least one anomaly characterisation rule by refining a most general rule by at least one of:
   a) addition of a new condition to the condition set; and
   b) unification of different variables to become constants or structured terms.

The computer software may incorporate instructions for controlling computer apparatus to at least partly evaluate a variable in the at least one anomaly characterisation rule which is defined as being in constant mode and is numerical by providing a range of values for the variable, estimating an accuracy for each value and selecting a value having optimum accuracy. It may incorporate instructions for controlling computer apparatus to filter out at least one of rule duplicates, rule equivalents and unnecessary 'less than or equal to' ("Iteq") conditions. It may also incorporate instructions for controlling computer apparatus to stop construction of a rule if at least one of three stopping criteria is fulfilled as follows:
   a) the number of conditions in any rule in a beam of rules being processed is greater than or equal to a prearranged maximum rule length,
   b) no negative examples are covered by a most significant rule, which is a rule that:
      i) is present in a beam currently being or having been processed,
      ii) is significant,
      iii) has obtained a highest likelihood ratio statistic value found so far, and
      iv) has obtained an accuracy value greater than a most general rule accuracy value, and
   c) no refinements were produced which were eligible to enter the beam currently being processed in a most recent refinement processing step.

DESCRIPTION OF THE FIGURES

In order that the invention might be more fully understood, an embodiment thereof will now be described, by way of example only, with reference to the accompanying drawings, in which:

FIG. 4. is a further flow diagram illustrating generation of a rule set using Higher Order Logic.

DETAILED DESCRIPTION OF THE INVENTION

Figure 1:
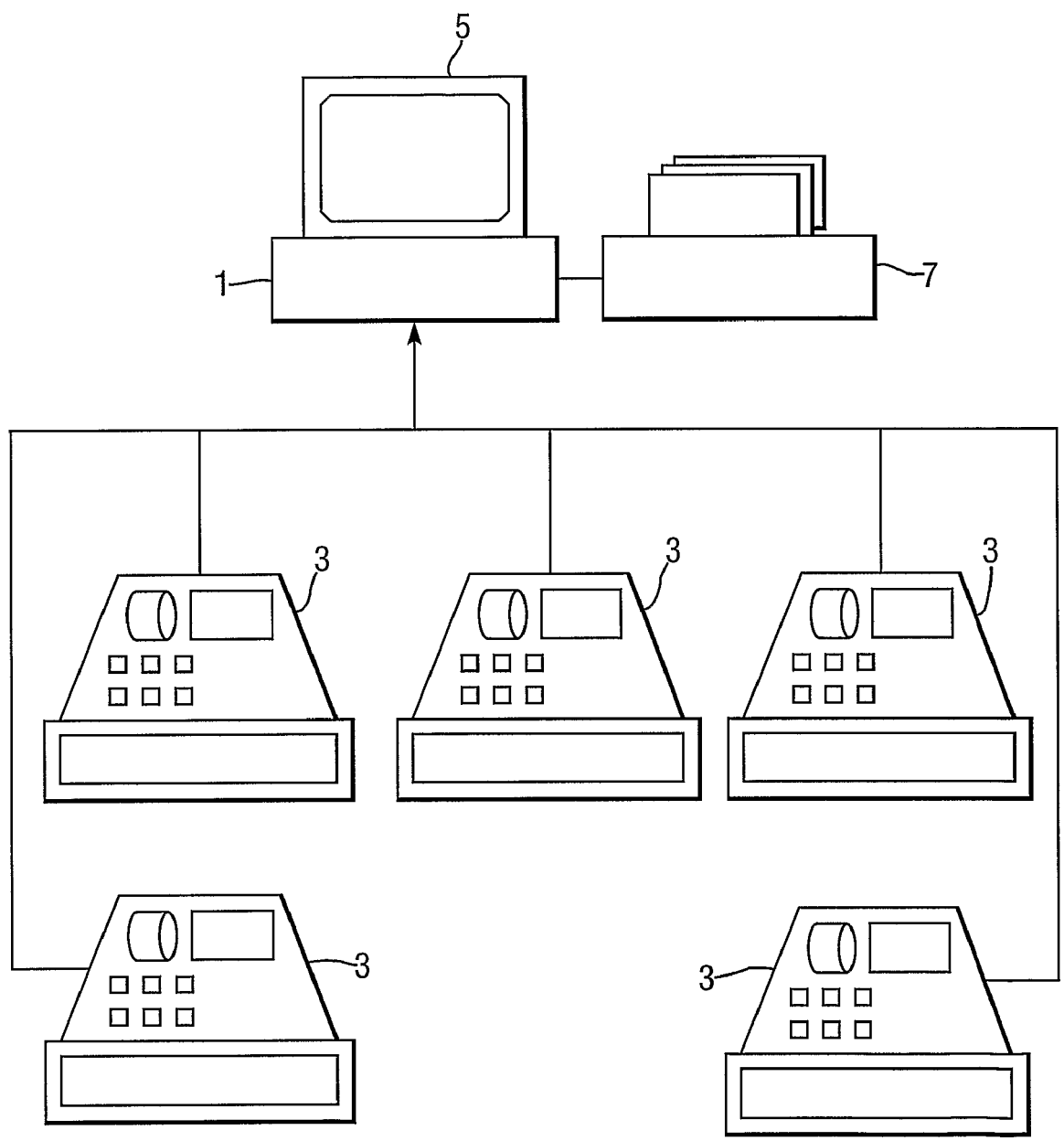
FIG. 1 illustrates use of a computer to monitor supermarket cashiers' tills in accordance with the invention.

One example of an application of automated anomaly detection using the invention concerns characterisation of retail fraud committed in shops by cashiers. The invention in this example may be used in conjunction with current commercial systems that can measure and record the amount of money put into and taken out of cashiers' tills. Various kinds of cashier behaviour may indicate fraudulent or suspicious activity.

In this example of the invention transactions from a number of different cashiers' tills were employed. Each transaction was described by a number of attributes including cashier identity, date and time of transaction, transaction type (e.g. cash or non-cash) and an expected and an actual amount of cash in a till before and after a transaction. Each transaction is labelled with a single Boolean attribute which indicates "true" if the transaction is known or suspected to be fraudulent and "false" otherwise. Without access to retail fraud experts, definitions of background knowledge were generated in the form of concepts or functions relating to data attributes. One such function calculated a number of transactions handled by a specified cashier and having a discrepancy: here a discrepancy is a difference in value between actual and expected amounts of cash in the till before and after a single transaction.

In this example, the process of the invention derives rules from a training data set and the definitions of basic concepts or functions associated with data attributes previously mentioned. It evaluates the rules using a test data set and prunes them if necessary. The rules so derived may be sent to an expert for verification or loaded directly into a fraud management system for use in fraud detection. To detect fraud, the fraud management system reads data defining new events and transactions to determine whether they are described by the derived rules or not. When an event or transaction is described by a rule then an alert may be given or a report produced to explain why the event was flagged up as potentially fraudulent. The fraud management system will be specific to a fraud application.

Benefits of applying the invention to characterisation of telecommunications and retail fraud comprise:

- Characterisations in the form of rule sets may be learnt automatically (rather than manually as in the prior art) from training data and any available background knowledge or rules contributed by experts—this reduces costs and duration of the characterisation process;
- Rule sets which are generated by this process are human readable and are readily assessable by human experts prior to deployment within a fraud management system; and
- the process may employ relational data, which is common in particular applications of the invention—consequently facts and transactions which are in different locations and which are associated can be linked together.

This example of the invention employs inductive logic programming software implemented in a logic programming language called Prolog. It has an objective of creating a set of rules that characterises a particular concept, the set often being called a concept description. A target concept description in this example is a characterisation of fraudulent behaviour to enable prediction of whether an event or transaction is fraudulent or not. The set of rules should be applicable to a new, previously unseen and unlabelled transaction and be capable of indicating accurately whether it is fraudulent or not.

A concept is described by data which in this example is a database of events or transactions that have individual labels indicating whether they are fraudulent or non-fraudulent. A label is a Boolean value, 1 or 0, indicating whether a particular event or transaction is fraudulent (1) or not (0). Labelling transactions as fraudulent identifies fraudulent cashiers, which are then are referred to as positive examples of the target concept; Labelling transactions as non-fraudulent identifies non-fraudulent cashiers which are referred to as negative examples of the target concept.

In addition to receiving labelled event/transactional data, the inductive logic programming software may receive input of further information, i.e. concepts, facts of interest or functions that can be used to calculate values of interest e.g. facts about customers and their accounts and a function that can be used to calculate an average monthly bill of a given customer. As previously mentioned, this further information is known as background knowledge, and is normally obtained from an expert in the relevant type of fraud.

As a precursor to generating a rule set, before learning takes place, the labelled event/transaction and cashier data is randomly distributed into two non-overlapping subsets—a training data set and a test data set. Here non-overlapping means no data item is common to both subsets. A characterisation or set of rules is generated using the training data set. The set of rules is then evaluated on the test data set by comparing the actual fraudulent or otherwise label associated with a cashier with the equivalent predicted for it by the inductive logic programming software. This gives a value for prediction (or classification) accuracy—the percentage of correctly assessed cashiers in the test data set. Testing on a different data set of hitherto unseen examples, i.e. a set other than the training data set, is a good indicator of the validity of the rule set.

The target concept description is a set of rules in which each rule covers or characterises a proportion of the positive (fraudulent) examples of data but none of the negative (non-fraudulent) examples. It is obtained by repeatedly generating individual rules. When a rule is generated, positive examples which it covers are removed from the training data set. The process then iterates by generating successive rules using unremoved positive examples, i.e. those still remaining in the training data set. After each iteration, positive examples covered by the rule most recently generated are removed. The process continues until there are too few positive examples remaining to allow another rule to be generated. This is known as the sequential covering approach, and is published in Machine Learning, T. Mitchell, McGraw-Hill, 1997.

Figure 2:
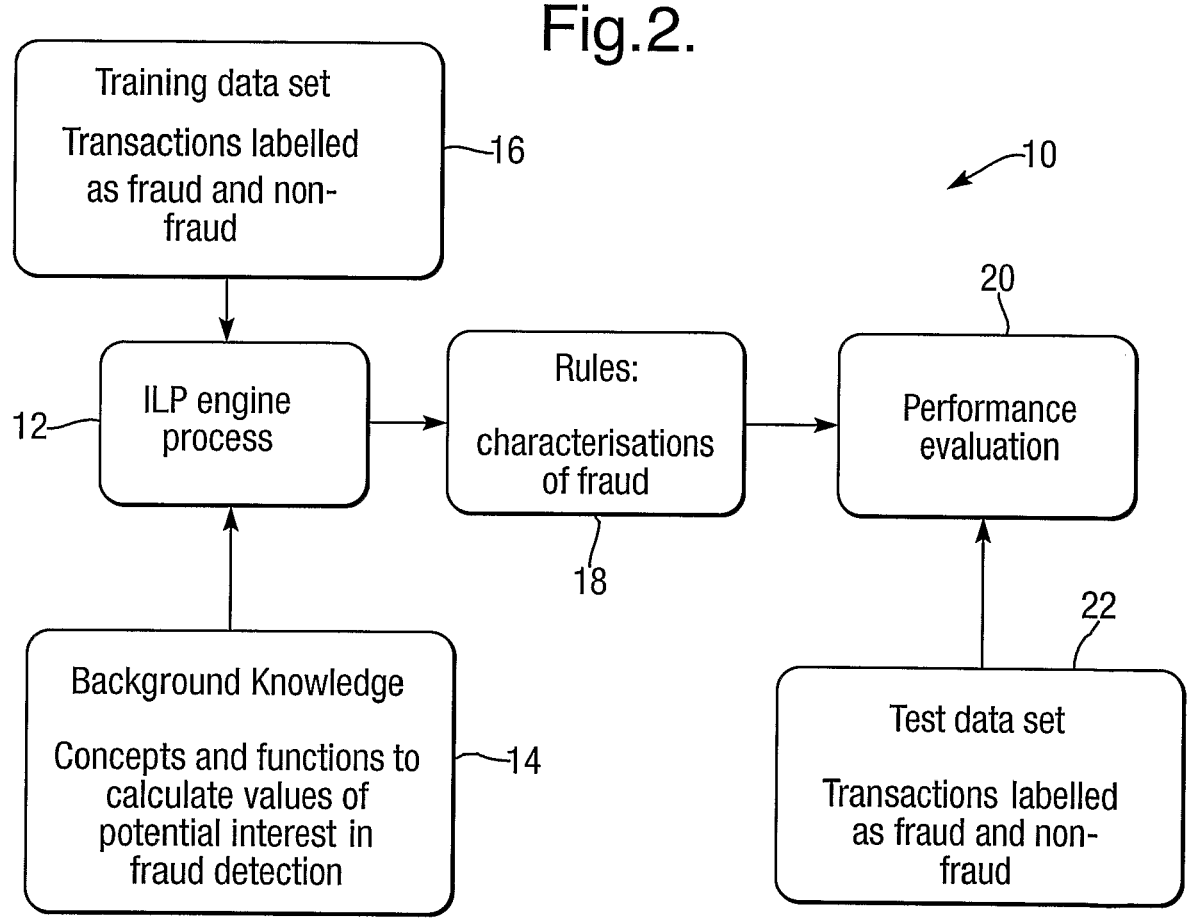
FIG. 2 is a flow diagram illustrating an automated, procedure implemented by the FIG. 1 computer—for characterisation of fraudulent transactions in accordance with the invention.

Referring to FIG. 1, an example of the invention involves use of a computer 1 to monitor cashiers' tills 3 in a supermarket (not shown). The computer 1 has an associated visual display unit 5 and printer 7. Referring now also to FIG. 2, the computer 1 (not shown in FIG. 2) implements a process 10 involving running inductive logic programming software (referred to as an ILP engine) at 12 to characterise fraudulent transactions: such transactions are indicated by data which the computer 1 detects is anomalous. The process 10 inputs background knowledge 14 and a training data set 16 to the computer 1 for processing at 12 by the ILP engine: this produces a set of rules 18. Rule set performance is evaluated at 20 using a test data set 22.

IF {set of conditions} THEN {behaviour is fraudulent}　　　(1)

A computer search for each individual rule begins at 30 with a most general rule (a rule with no conditions): searching is iterative (as will be described later) and generates a succession of rules, each new rule search beginning at 30. The most general rule is:

IF { } THEN target_predicate is true    (2)

This most general rule is satisfied by all examples, both positive and negative, because it means that all transactions and facts are fraudulent. It undergoes a process of refinement to make it more useful. There are two ways of producing a refinement to a rule as follows:

addition of a new condition to the IF{ } part of the rule;
unification of different variables to become constants or structured terms;

Addition of a new condition and unification of different variables are standard expressions for refinement operator types though their implementation may differ between systems. A condition typically corresponds to a test on some quantity of interest, and tests are often implemented using corresponding functions in the background knowledge. When a new condition is added to a rule, its variables are unified with those in the rest of the rule according to user-specified mode declarations. Unification of a variable X to a variable Y means that all occurrences of X in the rule will be replaced by Y. A mode declaration for a predicate specifies the type of each variable and its mode. A variable mode may be input, output, or a constant. Only variables of the same type can be unified. Abiding by mode rules reduces the number of refinements that may be derived from a single rule and thus reduces the space of possible concept descriptions and speeds up the learning process. There may be more than one way of unifying a number of variables in a rule, in which case there will be more than one refinement of the rule.

For example, a variable X may refer to a list of items. X could be unified to a constant value [ ] which represents an empty list or to [Y|Z] which represents a non-empty list with a first element consisting of a variable Y and having another variable Z representing the rest of the list. Instantiating X by such unification constrains its value. In the first case, X is a list with no elements and in the second case it must be a non-empty list. Unification acts to refine variables and rules that contain them.

Variables that are defined as being in constant mode must be instantiated by a constant value. Variables of constant type can further be defined by the user as either non-numerical or numerical constants.

If a constant is defined as non-numerical then a list of possible discrete values for the constant must also be specified by a user in advance. For each possible value of the constant, a new version of an associated refinement is created in which the value is substituted in place of the corresponding variable. New refinements are evaluated using an appropriate accuracy estimate and the refinement giving the best accuracy score is recorded as the refinement of the original rule.

If a constant is specified as numerical, it can be further defined as either an integer or a floating-point number. A method for calculating a best constant in accordance with the invention applies to both integers and floating point numbers. If a constant is defined as numerical then a continuous range of possible constant values must be specified by a user in advance. For example, if the condition was "minutes_past_the_hour(X)" then X could have a range 0-59.

In an integer constant search, if a range or interval length for a particular constant is less than 50 in length, all integers (points) in the range are considered. For each of these integers, a new version of a respective associated refinement is created in which the relevant integer is substituted in place of a corresponding variable and new rules are evaluated and given an accuracy score using an appropriate accuracy estimation procedure. The constant(s) giving a best accuracy score is(are) recorded.

If the integer interval length is greater than 50, then the computer 1 carries out a recursive process as follows:

1. A proportion of the points (which are evenly spaced) in the interval length are sampled to derive an initial set of constant values. For example, in the "minutes_past_the_hour(X)" example, 10, 20, 30, 40 and 50 minutes might be sampled. For each of these values, a new version of a respective refinement is created in which the value is substituted in place of a corresponding variable and a respective rule is evaluated for each value together with an associated accuracy estimate.

2. a. If a single constant value provides the best score then a number of the values (the number of which is a user selected parameter in the ILP engine 12) either side of this value are sampled. For instance, if the condition minutes_past_the_hour(20) gave the best accuracy then the following more precise conditions may then be evaluated:

minutes_past_the_hour(15)
minutes_past_the_hour(16)
minutes_past_the_hour(17)
minutes_past_the_hour(18)
minutes_past_the_hour(19)
minutes_past_the_hour(21)
minutes_past_the_hour(22)
minutes_past_the_hour(23)
minutes_past_the_hour(24)
minutes_past_the_hour(25)

If a single constant value in X=15 to 25 gives the best accuracy score then that value is chosen as a final value of the constant X.

2. b. If more than one constant value provides the best score then if they are consecutive points in the sampling then the highest and lowest values are taken and the values in their surrounding intervals are tested. For example, if minutes_past_the_hour(20), minutes_past_the_hour (30) and minutes_past_the_hour(40) all returned the same accuracy then the following points would be tested for accuracy:

minutes_past_the_hour(15)
minutes_past_the_hour(16)
minutes_past_the_hour(17)
minutes_past_the_hour(18)
minutes_past_the_hour(19)
minutes_past_the_hour(41)
minutes_past_the_hour(42)
minutes_past_the_hour(43)
minutes_past_the_hour(44)
minutes_past_the_hour(45)

If the accuracy score decreases at an integer value N in the range 15 to 19 or 41 to 45, then (N-1) is taken as the constant in the refinement of the relevant rule.

2. c. If a plurality of constant values provides the best accuracy score, and the values are not consecutive sampled points then they are arranged into respective subsets of consecutive points. The largest of these subsets is selected, and the procedure for a list of consecutive points is followed as at 2b above: e.g. if minutes_past_the_hour(20), minutes_past_the_hour(30) and minutes_past_the_hour(50) scored best then the subset minutes_past_the_hour(20)—minutes_past_the_hour (30) would be chosen. If the largest interval consists of only one value, then the procedure for a single returned value is followed as at 1. above.

The user can opt to conduct a beam constant search: here a beam is an expression describing generating a number of possible refinements to a rule and recording all of them to enable a choice to be made between them later when subsequent refinements have been generated. In this example, N refinements of a rule, each with a different constant value are recorded. This can be very effective, as the 'best' constant with highest accuracy at one point in the refinement process 32 may not turn out to be the 'best' value over a series of repeated refinement iterations. This avoids the process 32 getting fixed in local non-optimum maxima.

Some variables in conditions/rules may be associated with multiple constants: if so each constant associated with such a variable is treated as an individual constant, and a respective best value for each is found separately as described above. An individual constant value that obtains a highest accuracy score for the relevant rule is kept and the corresponding variable is instantiated to that value. The remaining variables of constant type are instantiated by following this process recursively until all constant type variables have been instantiated (i.e. substituted by values).

Once all refinements of a rule have been found, in accordance with the invention, the computer 1 filters refinements at 34 to remove any rules that are duplicates or equivalents of others in the set. Two rules are equivalent in that they express the same concept if their conditions in the IF {set of conditions} part of the rule are the same but the conditions are ordered differently. For example, IF {set of conditions} consisting of two conditions A and B is equivalent to IF {set of conditions} with the same two conditions in a different order, i.e. B and A. One of the two equivalent rules is removed from the list of refinements and so is not considered further during rule refinement, which reduces the processing burden.

Additionally, in accordance with the invention, symmetric conditions are not allowed in any rule. For example, a condition equal(X,2) means a variable X is equal in value to 2, is symmetric to equal(2,X), i.e. 2 is equal in value to a variable X. One of the two symmetric rules is removed from the list of refinements and so is not considered further.

Pruning refinements to remove equivalent rules and symmetric conditions results in fewer rules for the computer to consider at successive iterations of the refinement process 32, so the whole automated rule generation process is speeded up. Such pruning can reduce rule search space considerably, albeit the extent of this reduction depends on what application is envisaged for the invention and how many possible conditions are symmetric: in this connection where numerical variables are involved symmetric conditions are usually numerous due to the use of 'equals' conditions such as equal(Y,X). For example, in the retail fraud example, the rule search space can be cut by up to a third.

'less than or equals' condition referred to as 'Iteq', and an 'equals' conditions are often used as part of the background knowledge 14. They are very useful conditions for comparing numerical variables within the data. For this reason, part of the filtering process 34 ascertains that equals and Iteq conditions in rules meet checking requirements as follows:

End of interval check: the computer checks the end of intervals where constant values are involved: e.g. a condition Iteq(A, 1000) means variable A is less than or equal to 1000: it is unnecessary if A has a user-defined range of between 0 and 1000, so a refinement containing this condition is removed. In addition, Iteq(1000, A), 1000 is less than or equal to A, should be equals(A, 1000) as A cannot be more than 1000. Therefore, refinements containing such conditions are rejected.

Multiple 'Iteq' predicate check: if two conditions Iteq(A, X) and Iteq(B,X) where A and B are constants, are contained in the body of a rule, then one condition may be removed depending on the values of A and B. For example, if Iteq(30,X) and Iteq(40,X) both appear in a rule, then the computer removes the condition Iteq(30, X) from the rule as being redundant, because if 40 is less than or equal to X then so also is 30.

Equals and Iteq duplication check: in accordance with the invention if the body of a rule contains both conditions Iteq(C, Constant) and equals(C, Constant), then only the equals condition is needed. Therefore, refinements containing Iteq conditions with associated equals conditions of this nature are rejected by the computer.

Rule refinements are also filtered at 34 by the computer using a method called 'Encoding Length Restriction' disclosed by N. Lavrac and S. Dzeroski, Inductive Logic Programming: Techniques and Applications. Ellis Horwood, New York, 1994. It is based on a 'Minimum Description Length' principle disclosed by B. Pfahringer, Practical Uses of the Minimum Description Length Principle in Inductive Learning, PhD Thesis, Technical University of Vienna, 1995.

Where training examples are noisy (i.e. contain incorrect or missing values), it is desirable to ensure that rules generated using the invention does not overfit data by treating noise present in the data as requiring fitting. Rule sets that overfit training data may include some very specific rules that only cover a few training data samples. In noisy domains, it is likely that these few samples will be noisy: noisy data samples are unlikely to indicate transactions which are truly representative of fraud, and so rules should not be derived to cover them.

The Encoding Length Restriction avoids overfitting noisy data by generating a rule refinement only if the cost of encoding the refinement does not exceed the cost of encoding the positive examples covered by the refinement: here 'cost' means number of bits. A refinement is rejected by the computer if this cost criterion is not met. This prevents rules becoming too specific, i.e. covering few but potentially noisy transactions.

Once a rule is refined, the resulting refinements are evaluated in order to identify those which are best. The computer evaluates rules at 36 by estimating their classification accuracy. This accuracy may be estimated using an expected classification accuracy estimate technique disclosed by N. Lavrac and S. Dzeroski, Inductive Logic Programming, Techniques and Applications. Ellis Horwood, New York, 1994, and by F. Zelezny and N. Lavrac, An Analysis of Heuristic Rule Evaluation Measures, J. Stefan Institute Technical Report, March 1999. Alternatively, it may be estimated using a weighted relative accuracy estimate disclosed by N. Lavrac, P. Flach and B. Zupan, Rule Evaluation Measures: A Unifying View, Proceedings of the 9th International Workshop on Inductive Logic Programming (ILP-99), volume 1634 of Lecture Notes in Artificial Intelligence, pages 174-185, Springer-Verlag, June 1999. A user may decide which estimating technique is used to guide a rule search through a hypothesis space during rule generation.

Once refinements have been evaluated in terms of accuracy, they are then tested by the computer for what is referred to in the art of rule generation as 'significance'. In this example a significance testing method is used which is based on a likelihood ratio statistic disclosed in the N. Lavrac and S.

Dzeroski reference above. A rule is defined as 'significant' if its likelihood ratio statistic value is greater than a predefined threshold set by the user.

If a rule covers n positive examples and m negative examples, an optimum outcome of refining the rule is that one of its refinements (an optimum refinement) will cover n positive examples and no negative examples. A likelihood ratio for this optimum refinement can be calculated by the computer. A rule is defined as 'possibly significant' if its optimum refinement is significant. Arising from this definition, it is possible that a rule may not actually be significant, but it may be possibly significant.

The computer checks a rule under consideration in the process 12 at 38 to see whether or not it meets rule construction stopping criteria: in this connection, the construction of an individual rule terminates when the computer determines that any one or more of three stopping criteria is fulfilled as follows:

1. the number of conditions in any rule in a beam (as defined earlier) currently being processed is greater than or equal to a maximum rule length specified by the user. If a most significant rule (see at 2. below) exists this is added to the accumulating rule set at 40,
2. a most significant rule covers no negative examples— where the most significant rule is defined as a rule that is either present in the current beam, or was present in a previous beam, and this rule:
   a) is significant,
   b) obtained the highest likelihood ratio statistic value found so far, and
   c) obtained an accuracy value greater than the accuracy value of the most general rule (that covers all examples, both positive and negative), and
3. the previous refinement step 32 produced no refinements eligible to enter the new beam; if a most significant rule exists it is added to the accumulating rule set at 40.

Note that a most significant rule may not necessarily exist, if so no significant refinements have been found so far. If it is the case that a most significant rule does not exist but the stopping criteria at 38 are satisfied, then no rule is added to the rule set at 40 by the computer and the stopping criteria at 44 are satisfied (as will be described later).

When a rule is added at 40, the positive examples it covers are removed from the training data by the computer 1 at 42, and remaining or unremoved positive and negative examples form a modified training data set for a subsequent iteration (if any) of the rule search.

At 44 the computer 1 checks to see whether or not the accumulating rule set satisfies stopping criteria. In this connection, accumulation of the rule set terminates at 46 (finalising the rule set) when either of the following criteria is fulfilled, that is to say when either:

construction of a rule is terminated because a most significant rule does not exist, or too few positive examples remain for further rules to be significant.

If at 44 the accumulating rule set does not satisfy the rule set stopping criteria, the computer 1 selects another most general rule at 30 and accumulation of the rule set iterates through stages 32 etc. At any given time in operation of the rule generation process 12, there are a number (zero or more) rules for which computer processing has terminated and which have been added in the accumulating rule set, and there are (one or more) evolving rules or proto-rules for which processing to yield refinements continues iteratively.

If evolving rules are checked at 38 and are found not to meet any of the rule construction stopping criteria previously mentioned, those refinements of such rules are chosen which have the best accuracy estimate scores. The chosen refinements then provide a basis for a next generation of rules to be refined further in subsequent refinement iterations. The user defines the number of refinements forming a new beam to be taken by the computer to a further iteration by fixing a parameter called 'beam_width'. As has been said, a beam is a number of recorded possible refinements to a rule from which a choice will be made later, and beam_width is the number of refinements in it. For a beam width N, the refinements having the best N accuracy estimate scores are found and taken forward at 48 as part of the new beam to the next iteration. The sequence of stages 32 to 38 then iterates for this new beam via a loop 50.

Each refinement entering the new beam must:

be possibly significant (but not necessarily significant), and improve upon or equal the accuracy of its parent rule (the rule from which it was derived by refinement previously).

If required by the user, the accumulated rule set can be post-pruned by the computer using a reduced error pruning method disclosed by J. Fürnkranz, "A Comparison of Pruning Methods for Relational Concept Learning", Proceedings of AAAI'94 Workshop on Knowledge Discovery in Databases (KDD-94), Seattle, Wash., 1994. In this case, another set of examples should be provided—a pruning set of examples.

Examples of a small training data set, background knowledge and a rule set generated therefrom will now be given. In practice there may be very large numbers of data samples in a data set.

Training data

The training data, is a transaction database, represented as Prolog facts in a format as follows:

trans(Trans ID, Date, Time, Cashier, Expected amount in till, Actual amount in till, Suspicious Flag). Here 'trans' and 'Trans' mean transaction and ID means identity. A sample of an example set of transaction data is shown below. Transactions with Suspicious Flag=1 are fraudulent (positive examples), and with Suspicious Flag=0 are not (negative examples). The individual Prolog facts were:

trans(1,30/08/2003,09:02,cashier_1,121.87,123.96, 0).

trans(2,30/08/2003,08:56,cashier_1,119.38,121.82, 0).

trans(3,30/08/2003,08:50,cashier_1,118.59,119.38, 0).

trans(4,30/08/2003,08:48,cashier_1,116.50,118.59, 0).

trans(5,30/08/2003,08:44,cashier_1,115.71,116.50, 0).

trans(6,30/08/2003,22:40,cashier_2,431.68,435.17, 0).

trans(7,30/08/2003,22:37,cashier_2,423.70,431.68, 1).

trans(8,30/08/2003,22:35,cashier_2,420.01,423.70, 0).

These labelled transactions indicate that cashier_2 is suspected to have been fraudulent because the Suspicious Flag in the seventh of the above lines is 1, while cashier 1 is not giving us the following Prolog facts or statements:

Fraudulent(cashier_1).

Fraudulent(cashier_2).

The first statement is specifying that cashier_1 is not a fraudulent cashier because it begins with a minus sign. This is because the suspicious transaction flag is set to 0 for all of the transactions associated with cashier_1. Cashier_2 however has the Suspicious Flag set to 1 for one of the transactions associated with it, and therefore the second statement is specifying that cashier_2 is thought to be fraudulent. These provide positive and negative examples for learning the concept of a fraudulent cashier.

Background knowledge: this includes tests that are thought to be appropriate by a domain expert. Examples of appropriate background knowledge concepts, represented using Prolog, are:

discrepancy(Trans_ID, Discrepancy).

This gives the discrepancy in UK £ and pence between the expected amount of cash in a till and the actual amount of cash in that till for a particular transaction identity (Trans_ID), e.g.:
discrepancy(1, 2.09).
discrepancy(2, 2.44).
discrepancy(7, 7.98).
total_trans(Cashier number, Total number of transactions, Month/Year).

This gives the total number of transactions made by the cashier in a given month of a year, e.g.:
total_trans(cashier_1, 455, 08/2003).
total_trans(cashier_2, 345, 08/2003).
number_of_trans_with_discrepancy(Cashier, Number, Month/Year).

This gives the total number of transactions with a discrepancy made by a cashier in a given month of a year, e.g.:
number_of_trans_with_discrepancy(cashier_1, 38, 08/2003).
number_of_trans_with_discrepancy(cashier_2, 93, 08/2003).
number_of_trans_with_discrepancy_greater_than (Cashier, Number, Bound, Month/Year).

This gives the total number of transactions with a discrepancy greater than some bound made by a cashier in a given month of a year, e.g.:
number_of_trans_with_discrepancy_greater_than (cashier_1,5,100,08/2003).
number_of_trans_with_discrepancy_greater_than (cashier_1,3,150,08/2003).
number_of_trans_with_discrepancy_greater_than (cashier_2,15,100,08/2003)
number_of_trans_with_discrepancy_greater_than (cashier_2,2,200,08/2003).

Generated Rule Set:

The target concept is fraudulent(Cashier). The rule set characterises a cashier who has made fraudulent transactions.
fraudulent(Cashier)
number_of_trans_with_discrepancy_greater_than (Cashier, Discrepancies, 100, Month),
Discrepancies $\geq 10$.
fraudulent(Cashier):
total_trans(Cashier, Total_Trans, Month),
Total_Trans$\geq$455,
number_of_trans_with_discrepancy(Cashier, Discrepancies, Month),
Discrepancies$\geq$230.

This example of a generated rule set characterises fraudulent cashiers using two rules. The first rule indicates that a cashier is fraudulent if that in a single month, the cashier has performed at least 10 transactions with a discrepancy greater than 100.

The second rule describes a cashier as fraudulent if in a single month, the cashier has carried out at least 455 transactions, where at least 230 of these have had a discrepancy between the expected amount and the actual transaction amount.

The embodiment of the invention described above provides the following benefits:

speed of operation because it prunes out redundancy arising from duplicated rules and avoids associated unnecessary processing;

capability for dealing with and tune numerical and non-numerical constants to derive rules that bound variables (e.g. IF transaction value is between £19.45 and £67.89 THEN . . . );

capability for making use of many different heuristics (decision techniques e.g. based on scores for accuracy), which can be changed and turned on or off by a user;

a weighted relative accuracy measure is used in rule generation;

capability for developing rules that are readable and its reasoning can be understood (unlike a neural network for example);

capability for be tuning to a particular application by adjusting its parameters and changing/adding heuristics;

capability for use relational and structural data that can be expressed in Prolog;

capability for processing numerical and non-numerical data; and capability for making use of expert knowledge encoded in Prolog.

Figure 3:
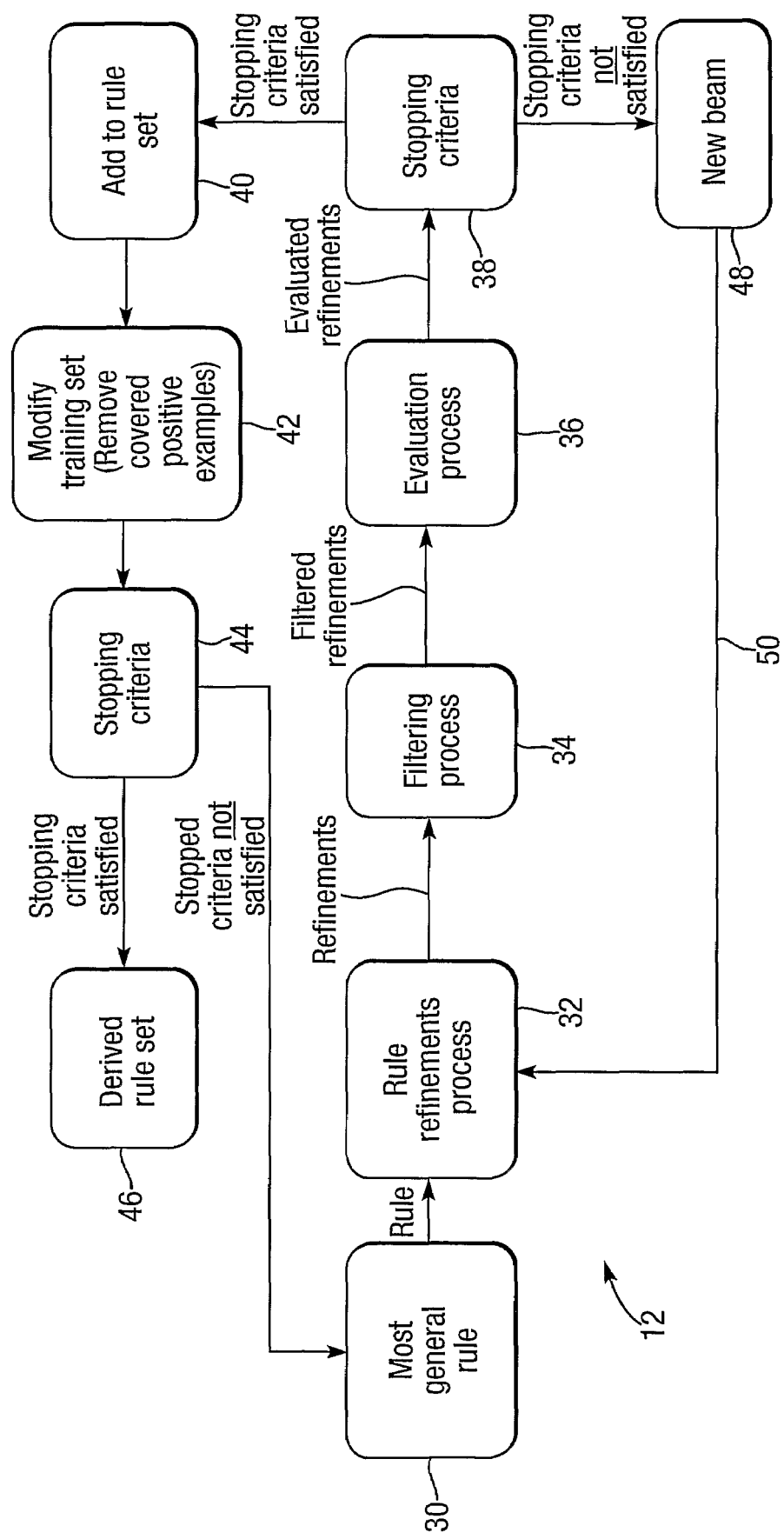
FIG. 3 is another flow diagram illustrating generation of a rule set in the FIG. 2 procedure for use in characterisation of fraudulent transactions.

In the embodiment of the invention described with reference to FIGS. 1 to 3, expression of characterisations of anomalous (e.g. fraudulent) behaviour in data was in First-Order Logic (e.g. Prolog programs). This is not essential. The characterisations may also be expressed in Higher-Order Logic using a programming language such as Escher: J. W. Lloyd (1999) "Programming in an Integrated Functional and Logic Language", Journal of Functional and Logic Programming 1999(3). As increasingly complex problems are tackled, a more intricate approach is desirable. Escher is a functional logic language whose higher-order constructs allow arbitrarily complex observations to be captured and highly expressive generalizations to be conveyed. The Higher-Order Logic arises from logic functions and predicates being allowed to take other functions and predicates as arguments: it provides a natural mechanism for reasoning about sets of objects.

Rules characterising anomalous behaviour may be automatically developed using a learning system that learns rules expressed in Higher-Order Logic such as the Strongly Typed Evolutionary Programming System (STEPS): see C. J. Kennedy Ph.D. Thesis (2000), Department of Computer Science, University of Bristol, England.

STEPS alleviates the challenging problem of identifying an underlying structure for searching the resulting hypothesis space efficiently. This is achieved through an evolutionary based search that allows the vast space of highly expressive Escher programs to be explored. STEPS provides a natural upgrade of the evolution of concept descriptions to the higher-order level.

In particular STEPS uses what is referred to as an 'individuals-as-terms' approach to knowledge representation: this approach localises all information provided by an example as a single item or expression incorporating a set of elements characteristic of that example. For example, in the preceding embodiment of the invention, the problem domain is concerned with characterising fraudulent cashiers. Using the individuals-as-terms representation, all information relating to an individual cashier is combined into a single item. Such information is the cashier's identifying number or id and the respective transactions that the cashier has generated Therefore each example consists of the cashier's id and a list of its transactions expressed as a single tuple (generic name for pair, triple etc.), e.g.:

(cashier1,[(1,(30,8,2003),(09:02),121.87,123.96), . . . (5, (30,8,2003),(08:44),115.71,116.5)]

This differs from the approach described in the preceding example where transactions were presented as separate Prolog facts.

The individuals-as-terms representation allows examples of arbitrary complexity to be treated in a uniform manner. STEPS also supports A-abstractions as arguments to higher-order functions thus enabling the creation of new functions not contained in an original alphabet. Finally, STEPS provides a number of specialised genetic operators for rule generation.

Rules learnt by STEPS are of the form:
IF {set of conditions} THEN {behaviour is anomalous} ELSE {behaviour is not anomalous}

This form is referred to as the rule template.

Referring to FIG. 4, a first step in a computer-implemented process 60 for generating or searching for rules is to use training examples 62 to create an alphabet 64 from which to construct the rules. This alphabet includes selector functions that allow properties of the training examples to be extracted so that comparisons and inferences can be made. Training examples are formed by using constructs known as datatypes such as lists, sets and tuples. Items contained in the lists, tuples and sets are referred to as components of the datatypes. The selector functions are automatically generated based on the datatypes of the training examples using an algorithm referred to as "AdaptedEnumerate" (see Kennedy reference above). Once the components of the datatypes have been selected, conditions can be built on them or they can be compared to values or other data types in the rules. In addition to the selector functions, the alphabet 64 consists of any additional concepts and facts of interest (background knowledge) expressed as Escher functions and constant values that may be extracted from training examples or specified by a user in advance. The background knowledge typically includes Boolean functions known as conjunction and disjunction (logical AND and OR). These functions can be used to combine a number of conditions and/or comparisons in a rule.

Once the alphabet has been compiled at 64 and input to the computer 1 in FIG. 1, the computer carries out an evolutionary search to produce a set of rules as follows. It forms a new or initial population of rules at 66 by combining components of the alphabet to form conditions of a number of rule templates, and an iteration count index G is set to 1. To implement this, the components of the alphabet are randomly combined, but in such a way that only valid Escher functions are formed. This is achieved by maintaining type consistency and variable consistency, defined by:

Type consistency: a function argument must be of a type for which the function was defined; e.g. if the function f(x, y)=x+y takes integers as its arguments x and y then by letting x become the value 4 and letting y become the value Red so that the function becomes "4+Red": this violates the type consistency constraint and cannot be incorporated in a rule.

Variable consistency: all local variables must be within the scope of a quantifier. The quantification of a variable in this context is logical terminology for specifying a range of values that the variable may take, e.g. in the following example the local variable x has been quantified (using a syntax \x→meaning of 'there exists a variable x such that') by stating that it is an element of the list t (t is a global variable representing a list and does not need to be quantified itself); but the local variable y has not been quantified, therefore the variable consistency constraint has been violated: e.g.:

\x->(elem x t)&& x+y>=2

Once the set of conditions of the rule templates has been completed, the rules so formed are evaluated by the computer at 68 by applying them to the training examples 62 in order to estimate the accuracy by which they classify the training examples as anomalous or not. This establishes their fitness, i.e. it identifies which of the rules are best at classifying the training examples. At 70, a check is made to determine whether or not one of two termination criteria is met, i.e. if either 1. a prearranged number of iterative search steps has been carried out, or
2. a rule that adequately classifies all of the training examples has been found to within a prearranged accuracy. The accuracy will not necessarily be 100% because that may result in noise contained in example data having too much effect.

If neither of the termination criteria is met, the computer begins a procedure to generate improved rules by using genetic operators to create a new population of rules from the previous population created at 66. A population count index is reset to zero at 72, and at 74 a check is made to determine whether or not the new population is complete. If the new population is not complete, a rule is selected at 76 from the previous population. A rule is selected from the previous population using tournament selection. To perform a tournament selection, a subset of the previous population rules is randomly selected, and the rule in the subset with the highest fitness (classification accuracy) is the winner and is selected. Each of the previous population rules has the same probability of being selected for the subset.

A genetic operator (see Kennedy reference above) is now selected by the computer at 78. It has one of the following functions: a) combining two rules to form a new rule, b) modifying a single rule by deleting one of its conditions or adding a new condition to it, or c) changing one of a rule's constant values for another of an appropriate type. Genetic operators are applied in such a way as to maintain type and variable consistency for rules. A check is made at 80 to determine whether or not the genetic operator selected at 78 has the function of combining two rules to form a new rule. If so, another rule is selected at 82 by implementing a further tournament using a new randomly selected subset of the previous population, and the two-rule genetic operator is applied at 84 to the pair of rules selected at 78 and 82. If not, the single-rule genetic operator is applied at 84 to the rule selected at 78. In either case a population count is then incremented by 1 at 86.

The process of stages 74 to 86 iterates until the population count indicates that the new population of rules is of prearranged number, e.g. perhaps but not necessarily equal to the population size created at 66. When the prearranged number is reached, the iteration count G is incremented by 1 at 88 and then the evaluate population stage 68 is triggered to evaluate the new population. The two termination criteria are checked once more at 70.

The procedure continues if neither criterion is met, i.e. if the iteration count G has not reached a prearranged maximum, or a rule has not been found that adequately classifies the training examples.

If one or both of the termination criteria are met, the computer terminates the rule search 60. The computer determines the best performing rule (i.e. giving the best classification accuracy with the training examples) by testing at 90, and its classification accuracy with one or more conditions removed is determined. To remove redundancy, it prunes (deletes from the rule) conditions that when removed do not alter the accuracy of the rule, and the pruned rule is designated as a result at 92. Although this is a single rule, the ability to use the Boolean logical OR function in the rules makes it possible for such a rule to be equivalent to a number of rules obtained in the preceding example.

Using data from the embodiment described with reference to FIGS. 1 to 3, to characterise a fraudulent cashier, an individuals-as-terms representation used by STEPS groups the transactions associated with each cashier into a list:

fraudulent((cashier1,[(1,(30,8,2003),(09:02),121.87, 123.96), ...,
(5,(30,8,2003),(08:44),115.71,116.5)])) =False;
fraudulent((cashier2,[(6,(30,8,2003),(22:40),431.68, 435.17), ...,
(8,(30,8,2003),(22:35),420.01,423.7)]))=True;

Therefore the selector functions generated for this problem include the ability to select transactions from the lists, to obtain sub-lists with transactions that have certain properties, to obtain the length of such sub-lists. The transactions themselves are tuples with five positions each corresponding to a respective datatype of which there are five; the selector functions allow each of the five datatypes to be extracted and processed using various conditions. Such a condition may consist of comparing datatype values to another or may be application of a background knowledge concept. The background knowledge may contain the discrepancy concept represented as an Escher function: this discrepancy function takes a transaction and returns the discrepancy between the expected amount of cash in the till and the actual amount. Background knowledge can be embodied as a calculation in this way. The background knowledge in this case is that a discrepancy might be a useful thing to look at when constructing the rules: if so, it is necessary to find the size of the discrepancy that is sufficient to indicate fraud. The additional concepts provided in the ILP case may be constructed from the discrepancy function with the selector functions that have been automatically generated during the rule construction process. For example, identification of the number of transactions made by a cashier in a given month and year may be achieved using the following Escher fragment (the variable x is global to the function in which the fragment would be contained and is therefore not further quantified):

length (filter (\y->(y'elem'(proj2x) && ((proj2(proj 2y) ==Month) && (proj3(proj2y) ==Year))));

In the above expression, a filter function creates a list of 'y's that meet a number of criteria. First the ys are quantified: '\y →y 'elem' (proj2 x)' specifies that the items in the list (represented by the variable y) are the transactions associated with a cashier. The proj2 y function projects onto a second datatype that makes up an example (the example is represented by the global variable x). The cashier's id is a first datatype and the second datatype is a list of transactions associated with the cashier. The filter function is used to filter out transactions that meet two criteria. The first criterion is that the transactions fall within a given month: '(proj2 (proj2 y)==Month)'. The variable y has been quantified to be a transaction. A transaction is itself a tuple with five positions, the second position of the transaction tuple (obtained by applying the 'proj2' function) specifies the date as a triple (three position tuple), the second position of which contains the month (obtained by applying a further 'proj2' function). The month is then compared to a given month 'Month' (using the '==Month' function). The second criterion is that the transactions that make up the list fall within a given year: '(proj3 (proj2 y) ==Year)'. The date triple is obtained in the same manner as described above, but this time it is the third element of the date, the year, that is of interest (obtained using the 'proj3' function). The year contained in the date triple is then compared to a given year 'Year'. The length of this filtered list of transactions is then obtained using the 'length' function to provide the number of transactions that meet the specified criteria.

In order to identify the total number of transactions with a discrepancy made by a cashier in a given month, the following is used:

length (filter (\y->(y 'elem' (proj2 x) &&(((proj2 (proj2y) ==Month) && (proj3 (proj2 y) == 2003)) && (( discrepancy y) !=0)))));

Here again in the above expression a filter function is used to obtain a list of transactions (represented by the variable y) that meet two criteria. The first criterion is the same as above, the transactions all fall in a given month (obtained using '(proj2 (proj2 y) ==Month)'). In this case the second criterion uses the discrepancy function (specified as background knowledge) to obtain the discrepancy between the expected amount of cash in the till and the actual amount during transaction y (using 'discrepancy y'). The value obtained by this function is then tested to check that it is not equal to zero (using '((discrepancy y) !=0)'). The length function is then used to obtain the length of the list containing (and hence number of) transactions that occur within a given month that have a non-zero discrepancy between the expected amount of cash in the till and the actual amount.

The rule set presented in the earlier example can then equivalently be expressed in Escher as follows:

```
fraudulent(cashier) = if
    (length (filter (\y -> (y 'elem' (proj2 x) &&(
    ((proj2 (proj2 y) == Month) &&
    (( discrepancy y) > 100 ))))))
    >= 10
    then True
    else False;
``` this rule expresses that, if the number of transactions associated with a cashier, carried out in a given month with a discrepancy greater than or equal to 100, is greater than or equal to 10, then the cashier is fraudulent.

```
fraudulent(cashier) = if
    (length (filter (\y -> (y 'elem' (proj2 x) &&(
    ((proj2 (proj2 y) == Month) &&
    (( discrepancy y) != 0 ))))))
    >= 455
    then True
    else False;
```

This rule expresses that, if the number of transactions with non-zero discrepancy associated with an individual cashier and carried out in a given month is greater than or equal to 455, then the cashier is fraudulent.

Another embodiment of the invention concerns characterisation of software vulnerabilities in a disassembled equivalent of binary code by code anomaly detection. It may be used in conjunction with current commercially available systems that can disassemble binary code. In this embodiment, disassembly of a program in binary code is a process which retrieves an assembly language equivalent of the program. Disassembly is to facilitate human understanding during development of a rule set; however, it is not essential and once rules have been learnt in assembly language they may be translated to operate directly on binary program code.

Data anomalies may be detected in the form of vulnerabilities in compiled binary code and disassembled binary code using hand-crafted rules to identify potential bugs in the code. The rules are generated by human experts in vulnerability detection. For example, in a hand crafted rule set category, a "SmartRisk Analyzer" product of the @stake company looks for "triggers" in a computer program written in assembly language code. "Triggers" are calls to functions (such as strcpy) known to be vulnerable. On finding a trigger, SmartRisk Analyzer traces a data and control path back through the program in order to determine possible values of parameters comprising an argument of the vulnerable or unsafe function, to see if the function call will be vulnerable during run time. So-called black-box testing technologies are more commonly used, usually referred to as "fuzzers"; fuzzers essentially perform a random search or a brute force search through a (usually intractably large) space of test vectors. They can also be enhanced by hand crafting constraints on the search space's domain.

Various kinds of fragments of code may indicate a vulnerability in a software application which is potentially exploitable by an unauthorised intruder. The most common form of vulnerability is a buffer overflow. Strings in the C programming language are sequences of bytes, with a zero indicating the end of a string. This allows strings to be of unlimited length. However, memory is in limited supply, so fixed-size buffers must be allocated to hold strings. Copying a string of unknown (potentially unlimited) length into a buffer of fixed size can cause errors. If a C function known as strcpy is used, then the string will be copied even if it overflows its allocated space. In a C program it is typical to allocate fixed buffers for strings on a computer stack. This means that overflowing the buffer will overwrite a part of the stack not allocated to the buffer.

C is a procedural language that involves many function calls. Function calls are usually implemented on a computer (at a low level) by putting on to the stack a code address to return to after the call. Nested and recursive function calls may be implemented in this way. However, this approach enables a buffer overflow to overwrite the return address on the stack, and consequently data intended for the buffer replaces the return address. Overflow data supplied by an attacker may therefore specify a new return address, thus altering operation of a program containing the overwritten return address.

A common technique for an attacker to alter a return address is to supply program code to be executed in a buffer, and make the new return address point into that code; this makes the program execute arbitrary code inserted by the attacker. Another tactic is arc injection, which is a method that involves returning into an address in a known common library (such as the C standard library), to execute a C function such as system( ), which will execute a command on the host machine.

In this embodiment of the invention a number of different disassembled software programs are employed. Each program is broken down into individual instructions that form the program, where each instruction is described by a number of attributes including a program identifier (to indicate which program the instruction belonged to), the address of the instruction, the instruction operator and a list of the instructions operands. Each program is labelled with a single Boolean attribute which indicates "true" if the program is known or suspected to contain a vulnerability and "false" otherwise. Background knowledge which is used includes such functions as identifying a copying loop within a program. A copying loop is defined as a portion of code that (in any order) copies to a register (the Temporary Register) from a source pointer, changes the source pointer, copies from the register into a destination pointer, changes that destination pointer, and has a control flow path from the end of the code back to the start (thus forming a loop). Other definitions of a similar nature are also applicable.

Benefits of applying the invention to characterisation of software vulnerablities comprise:
  enabling prevention of intrusions, by detecting features that an intruder might use, before the intruder has a chance to do so—"prevention is better than cure";
  no reliance on access to source code;
  potential for faster operation than source code static analysis;
  potential to be more effective than existing black-box testing, because this embodiment studies the code for known semantic patterns, rather than probing it for potential bugs;
  characterisations in the form of rule sets may be learnt automatically (rather than manually as in the prior art) from training data and any available background knowledge or rules contributed by experts—this reduces costs and duration of the characterisation process;
  Rule sets which are generated by this process are human readable and are readily assessable by human experts prior to deployment within a fraud management system.

This embodiment of the invention employs inductive logic programming software implemented in the Prolog logic programming language previously described. The target concept description in this embodiment is a characterisation of software vulnerabilities to enable prediction of whether a compiled program is vulnerable or not. The set of rules should be applicable to a new, previously unseen and unlabelled disassembled program and be capable of indicating accurately whether it is vulnerable or not.

IF {set of conditions} THEN {program is vulnerable}   (3)

In addition to receiving labelled program data, the inductive logic programming software may receive input of further information, i.e. concepts, facts of interest or functions that can be used to calculate values of interest e.g. facts regarding the existence of copying loops within the compiled programs. As previously mentioned, this further information is known as background knowledge, and is normally obtained from an expert in the detection of software vulnerabilities.

Examples of a small training data set, background knowledge and a rule set generated therefrom will now be given.

Training Data:
  The training data is a set of disassembled software programs that are referenced by a program identifier. The target concept is vulnerable(Program Identifier).
  vulnerable(program1).
  vulnerable(program2). . . .

:-vulnerable(programx).
:-vulnerable(programy).

The first two of the four statements immediately above are specifying that program1 and program2 contain vulnerabilities. The third and fourth of these statements are preceded by the symbols ":-" specifying that programx and programy do not contain vulnerabilities. These form positive and negative examples for learning the concept of a vulnerable program.

Instructions that form the programs can be stored in a number of formats. An initial simple format is in Prolog facts with one fact per instruction:

simple_instruction(Program Identifier, Instruction Address, Instruction Operator, Instruction Operand List).).

A sample of an example set of simple instruction data associated with the program with program identifier "program1" is shown below.

simple_instruction(program1_exe,x401000,mov,[x8,[esp,x1],eax]).
simple_instruction(program1_exe,x401004,mov,[eax,edx]).
simple_instruction(program1_exe,x401006,mov,[[eax],cl]).
simple_instruction(program1_exe,x401008,inc,[eax]).
simple_instruction(program1_exe,x401009,test,[cl,cl]).
simple_instruction(program1_exe,x40100b,jne,[x401006]).
simple_instruction(program1_exe,x40100d,push,[esi]).
simple_instruction(program1_exe,x40100e,push,[edi]).
simple_instruction(program1_exe,x40100f,mov,[xc,[esp,x1],edi]).
simple_instruction(program1_exe,x401013,sub,[edx,eax]).
simple_instruction(program1_exe,x401015,dec,[edi]).
simple_instruction(program1_exe,x401016,mov,[[x1,[edi]],cl]).
simple_instruction(program1_exe,x401019,inc,[edi]).
simple_instruction(program1_exe,x40101a,test,[cl,cl]).
simple_instruction(program1_exe,x40101c,jne,[x401016]).
simple_instruction(program1_exe,x40101e,mov,[eax,ecx]).
simple_instruction(program1_exe,x401020,shr,[x2,ecx]).
simple_instruction(program1_exe,x401023,mov,[edx,esi]).
simple_instruction(program1_exe,x401025,repz,[movsl,ds,[esi],es,[edi]]).
simple_instruction(program1_exe,x401027,mov,[eax,ecx]).
simple_instruction(program1_exe,x401029,and,[x3,ecx]).
simple_instruction(program1_exe,x40102c,push,[x408040]).
simple_instruction(program1_exe,x401031,repz,[movsb,ds,[esi],es,[edi]]).
simple_instruction(program1_exe,x401033,call,[x401120]).
simple_instruction(program1_exe,x403173,mov,[[esi],al]).
simple_instruction(program1_exe,x403175,add,[xl,esi]).
simple_instruction(program1_exe,x403178,mov,[al,[edi]]).
simple_instruction(program1_exe,x40317a,add,[x1,edi]).
simple_instruction(program1_exe,x40317d,test,[al,al]).
simple_instruction(program1_exe,x40317f,je,[x4031b8]).
simple_instruction(program1_exe,x403181,sub,[x1,ebx]).
simple_instruction(program1_exe,x403184,jne,[x403173]).

The simple instructions can also be transformed into a graph-like format of nodes, with each node represented as a Prolog fact containing either a sequence of non-branching code, or a branching instruction, e.g.:

node_instruction( Program Identifier, Block Start Index, Block Length, List of Triples: (Instruction Address; Instruction Operator, Instruction Operand List)).

Block Length in the above instruction can be zero, which indicates that the list contains a single branching instruction. A branch is a program control structure in which one or more alternative sets of instructions are selected for execution. The selection is carried out when the program is run by means of a branching instruction.

A sample of an example set of graphically represented instruction data is shown below.

node_instruction(program1_exe,1,5,[(x401000,mov,[x8,[esp,x1],eax]),(x401004,mo v,[eax,edx]),(x401006,mov,[[eax],cl]),(x401008,inc,[eax]),(x401009,test,[cl,cl])]).
node_instruction(program1_exe,6,0,[(x40100b,jne,[x401006])]).
node_instruction(program1_exe,7,8,[(x40100d,push,[esi]),(x40100e,push,[edi]),(x40 100f,mov,[xc,[esp,x1],edi]),(x401013,sub,[edx,eax]),(x401015,dec,[edi]),(x401016,m ov,[[x1,[edi]],cl]),(x401019,inc,[edi]),(x40101a,test,[cl,cl])]).
node_instruction(program1_exe,15,0,[(x40101c,jne,[x401016])]).
node_instruction(program1_exe,16,8,[(x40101e,mov,[eax,ecx]),(x401020,shr,[x2,ec x]),(x401023,mov,[edx,esi]),(x401025,repz,[movsl,ds,[esi],es,[edi]]),(x401027,mov,[eax,ecx]),(x401029,and,[x3,ecx]),(x40102c,push,[x408040]),(x401031,repz,[movsb, ds, [esi],es,[edi]])]).
node_instruction(program1_exe,24,0,[(x401033,call,[x401120])]).....
node_instruction(program1_exe,3061,5,[(x403173,mov,[[esi],al]),(x403175,add,[x1, esi]),(x403178,mov,[al,[edi]]),(x40317a,add,[x1,edi]),(x40317d,test,[al,al])]).
node_instruction(program1_exe,3066,0,[(x40317f,je,[x4031b8])]).
node_instruction(program1_exe,3067,1,[(x403181,sub,[x1,ebx])]).
node_instruction(program1_exe,3068,0,[(x403184,jne,[x403173])]).

This graph format can then be normalised by splitting nodes to ensure that each branch always points to the start of a node (instruction sequence), never the middle.

Background knowledge: this includes tests that are thought to be appropriate by a domain expert. Examples of appropriate background concepts, represented using Prolog, are:

copying_loop(Program Identifier, Loop Start Index, List of Triples: (Instruction Address Instruction Operator, Instruction Operand List), Temporary Register).

The definition of a copying loop has been given previously, and an example is as follows:.

copying_loop(program1_exe,3061,[(x403173, mov, [[esi], al]), (x403175, add, [x1, esi]), (x403178, mov, [al, [edi]]), (x40317a, add, [x1, edi]), (x40317d, test, [al, al]), (x40317f, je, [x4031b8]), (x403181, sub, [x1, ebx]), (x403184, jne, [x403173])],al).

length_loop(Program Identifier, Loop Start Index, List of Triples: (Instruction Address Instruction Operator, Instruction Operand List)).

A length (finding) loop is defined as a portion of code that (in any order) copies to a register from a source pointer, changes the source pointer, and checks the register for a value of zero, and has a control flow path from the end of the code back to the start (thus forming a loop).

length_loop(program1_exe,1,[(x401006, mov, [[eax], cl]), (x401008, inc, [eax]), (x401009, test, [cl, cl]), (x40100b, jne, [x401006])],cl).

length_loop(program1_exe,7,[(x401016, mov, [[x1, [edi]], cl]), (x401019, inc, [edi]), (x40101a, test, [cl, cl]), (x40101c, jne, [x401016])],cl).

follows(Program Identifier, Block A Index, Block B Index, List of Triples: (Instruction Address, Instruction Operator, Instruction Operand List)).

This is an item of background knowledge which describes the situation if Block B follows Block A. Usually this is bounded by an upper limit of the number of instructions between Block A and Block B to prevent a large amount of background knowledge being generated by the combinatorial nature of the predicate. The list of instructions between the two blocks is also stored in the background knowledge. E.g.

follows(program1_exe,6,15,[(x40100d,push,[esi]), (x40100e,push,[edi]),(x40100f,mo v,[xc,[esp,x1],edi]), (x401013,sub,[edx,eax]),(x401015,dec,[edi]), (x401016,mov,[[x1,[edi]],cl]),(x401019,inc,[edi]), (x40101a,test,[cl,cl])]).

strlen_call(Program Identifier, StrlenIndex).

This item of background knowledge indicates that the program makes a call to the function strlen at the specified index,e.g.:

strlen_call(program1_exe,1000).

get_jump_tests_from_list(InstructionList, JumpTests).

This item of background knowledge extracts tests that precede conditional jumps in an instruction list.

empty_list(List).

This item of background knowledge tests whether or not a given list is empty.

single_item_list(List, RegisterTested).

This item of background knowledge tests whether or not a given list has a single jump test (conditional), and if it is, returns the tested register in RegisterTested.

unreferenced_registers(InstructionList, Register).

This item of background knowledge tests whether or not the given list modifies the given register.

Generated rule set: The target concept is vulnerable(Program Identifier). Rules in the following rule set characterises programs that are vulnerable to buffer overflows.

vulnerable(Program):
copying_loop(Program, CopyingIndex, CopyingLoop, CopyingRegister),
strlen_call(Program, StrlenIndex),
follows(Program,StrlenIndex,CopyingIndex,InstrBetween),
getjump_tests_from_list(InstrBetween, JumpTests),
empty_list(JumpTests).
vulnerable(Program):
copying_loop(Program, CopyingIndex, CopyingLoop, CopyingRegister),
get_jump_tests_from_list(CopyingLoop, JumpTests),
has_test_for_zero(JumpTests, TestForZero, OtherTests),
single_item_list(OtherTests, RegisterTested),
unreferenced_registers(CopyingLoop, RegisterTested).

The first rule of the above rule set classifies a program as vulnerable if there is a copying loop preceded by a call to the C function strlen, with no conditional jumps between the two. The second rule classifies a program as vulnerable if there is a copying loop, with a test for zero, and one other test, but a register referenced by the other test is not used during the loop.

The software vulnerability embodiment of the invention described above provides similar benefits to those associated with the fraud embodiment described with reference to FIG. 1 to 3.

The processes described in the foregoing description can clearly be evaluated by an appropriate computer program comprising program instructions embodied in an appropriate carrier medium and running on a conventional computer system. The computer program may be embodied in a memory, a floppy or compact or optical disc or other hardware recordal medium, or an electrical or optical signal. Such a program is straightforward for a skilled programmer to implement on the basis of the foregoing description without requiring invention, because it involves well known computational procedures.

The invention claimed is:

1. An automated method of detection of software vulnerabilities by applying a rule set to test for vulnerabilities in computer software, the rule set comprising at least one vulnerability characterisation rule, the method incorporating the steps of:

a) providing a training data set of computer software incorporating positive and negative vulnerability examples and expressed as programs flagged to indicate either presence or absence of vulnerability, the programs comprising instructions each incorporating an identifier to indicate its associated program, the instruction's address, an instruction operator and a list of instruction operands, b) defining a rule generalisation, the rule generalisation being processable to transform it into the at least one vulnerability characterisation rule, and c) using computer apparatus to execute the steps of:
  i) receiving the training data set and the rule generalisation,
  ii) processing the rule generalisation to transform it into a more specific rule generalisation by employing logic of at least First-Order and adding to the rule generalisation at least one of a condition, a variable, a constant, a unification of variables and a function based on the training data set and background knowledge relating to attributes of the training data set and consisting of at least one of concepts, facts of interest and functions for calculating values of interest from items of data,
  iii) evaluating the more specific rule generalisation by applying it to the training data set to identify vulnerabilities, and
  iv) incorporating the more specific rule generalisation in the rule set if it classifies vulnerabilities in the training data set adequately in terms of covering at least some of the positive vulnerability examples,
  v) applying the rule set to a test program for vulnerability detection therein, and
  vi) providing an alert or a report to a user regarding vulnerability detection in the test program resulting from operation of the method in order to enable corrective action to be taken.

2. An automated method of detection of software vulnerabilities according to claim 1 wherein the background knowledge includes at least one of the following tests:

a) a copying loop test,
b) a length loop test,
c) a test for one block following another,
d) a test for making a call to a string length function at a specified index,
e) a test for tests that precede conditional jumps in an instruction list,
f) a test for whether or not a given list is empty,
g) a test for whether or not a given list has a single jump test (conditional), and if it is, to return a tested register, and
h) a test for whether or not a given list modifies a given register.

3. An automated method of detection of software vulnerabilities according to claim 1 wherein the rule set incorporates a rule which classifies a program as vulnerable if there is a copying loop preceded by a call to a string length function, with no conditional jumps therebetween.

4. An automated method of detection of software vulnerabilities according to claim 1 wherein the rule set incorporates a rule which classifies a program as vulnerable if there is a copying loop defined as a portion of code that copies to a register from a source pointer, changes the source pointer, copies from the register into a destination pointer, changes that destination pointer, and has a control flow path from the code portion's end back to the code portion's beginning thus forming a loop.

5. An automated method of detection of software vulnerabilities according to claim 1 wherein the rule set incorporates a rule which classifies a program as vulnerable if there is a copying loop with a test for zero, and one other test, but a register referenced by the other test is not used during the loop.

6. A system for computer-implemented detection software vulnerabilities by applying a rule set to test for vulnerabilities in computer software, the rule set comprising at least one vulnerability characterisation rule, the system incorporating computer apparatus incorporating a computer program stored in a hardware recording medium and being programmed by such computer program to carry out the steps of:
a) receiving a training data set of computer software incorporating positive and negative vulnerability examples and expressed as programs flagged to indicate either presence or absence of vulnerability, the programs comprising instructions each incorporating an identifier to indicate its associated program, the instruction's address, an instruction operator and a list of instruction operands,
b) receiving a rule generalisation which is processable to transform it into the at least one vulnerability characterisation rule, and
c) processing the rule generalisation to transform it into a more specific rule generalisation by employing logic of at least First-Order and adding to the rule generalisation at least one of a condition, a variable, a constant, a unification of variables and a function based on the training data set and background knowledge relating to attributes of the training data set and consisting of at least one of concepts, facts of interest and functions for calculating values of interest from items of data,
d) evaluating the more specific rule generalisation by applying it to the training data set to identify vulnerabilities, and
e) incorporating the more specific rule generalisation in the rule set if it classifies vulnerabilities in the training data set adequately in terms of covering at least some of the positive vulnerability examples,
f) applying the rule set to a test program for vulnerability detection therein, and
g) providing an alert or a report to a user regarding vulnerability detection in the test program resulting from operation of the method in order to enable corrective action to be taken.

7. A system for detection of software vulnerabilities according to claim 6 wherein the background knowledge includes at least one of the following tests:
a) a copying loop test,
b) a length loop test,
c) a test for one block following another,
d) a test for making a call to a string length function at a specified index,
e) a test for tests that precede conditional jumps in an instruction list,
f) a test for whether or not a given list is empty,
g) a test for whether or not a given list has a single jump test (conditional), and if it is, to return a tested register, and
h) a test for whether or not a given list modifies a given register.

8. A system for detection of software vulnerabilities according to claim 6 wherein the rule set incorporates a rule which classifies a program as vulnerable if there is a copying loop preceded by a call to a string length function, with no conditional jumps therebetween.

9. A system for detection of software vulnerabilities according to claim 6 wherein the rule set incorporates a rule which classifies a program as vulnerable if there is a copying loop defined as a portion of code that copies to a register from a source pointer, changes the source pointer, copies from the register into a destination pointer, changes that destination pointer, and has a control flow path from the code portion's end back to the code portion's beginning thus forming a loop.

10. A system for detection of software vulnerabilities according to claim 6 wherein the rule set incorporates a rule which classifies a program as vulnerable if there is a copying loop with a test for zero, and one other test, but a register referenced by the other test is not used during the loop.

11. A computer readable hardware medium which embodies computer readable instructions for controlling operation of computer apparatus to implement detection of software vulnerabilities by applying a rule set to test for vulnerabilities in computer software, the rule set comprising at least one vulnerability characterisation rule, wherein the instructions provide for control of the computer apparatus to carry out the steps of:
a) receiving a training data set of computer software incorporating positive and negative vulnerability examples and expressed as programs flagged to indicate either presence or absence of vulnerability, the programs comprising instructions each incorporating an identifier to indicate its associated program, the instruction's address, an instruction operator and a list of instruction operands,
b) receiving a rule generalisation which is processable to transform it into the at least one vulnerability characterisation rule, and
c) processing the rule generalisation to transform it into a more specific rule generalisation by employing logic of at least First-Order and adding to the rule generalisation at least one of a condition, a variable, a constant, a unification of variables and a function based on the training data set and background knowledge relating to attributes of the training data set and consisting of at least one of concepts, facts of interest and functions for calculating values of interest from items of data, d) evaluating the more specific rule generalisation by applying it to the training data set to identify vulnerabilities, and
e) incorporating the more specific rule generalisation in the rule set if it classifies vulnerabilities in the training data set adequately in terms of covering at least some of the positive vulnerability examples,
f) applying the rule set to a test program for vulnerability detection therein, and
g) providing an alert or a report to a user regarding vulnerability detection in the test program resulting from operation of the method in order to enable corrective action to be taken.

12. A computer readable hardware medium according to claim 11 wherein the background knowledge includes at least one of the following tests:
 a) a copying loop test,
 b) a length loop test,
 c) a test for one block following another,
 d) a test for making a call to a string length function at a specified index,
 e) a test for tests that precede conditional jumps in an instruction list,
 f) a test for whether or not a given list is empty,
 g) a test for whether or not a given list has a single jump test (conditional), and if it is, to return a tested register, and
 h) a test for whether or not a given list modifies a given register.

13. A computer readable hardware medium according to claim 11 wherein the rule set incorporates a rule which classifies a program as vulnerable if there is a copying loop preceded by a call to a string length function, with no conditional jumps therebetween.

14. A computer readable hardware medium according to claim 11 wherein the rule set incorporates a rule which classifies a program as vulnerable if there is a copying loop defined as a portion of code that copies to a register from a source pointer, changes the source pointer, copies from the register into a destination pointer, changes that destination pointer, and has a control flow path from the code portion's end back to the code portion's beginning thus forming a loop.

15. A computer readable hardware medium according to claim 11 wherein the rule set incorporates a rule which classifies a program as vulnerable if there is a copying loop with a test for zero, and one other test, but a register referenced by the other test is not used during the loop.

* * * * *

UNITED STATES PATENT AND TRADEMARK OFFICE
CERTIFICATE OF CORRECTION

PATENT NO. : 7,627,543 B2  Page 1 of 1
APPLICATION NO. : 10/580767
DATED : December 1, 2009
INVENTOR(S) : Lock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 167 days.

Signed and Sealed this

Second Day of November, 2010

David J. Kappos
*Director of the United States Patent and Trademark Office*